(12) United States Patent
Scheideler et al.

(10) Patent No.: US 11,397,825 B2
(45) Date of Patent: Jul. 26, 2022

(54) ENCRYPTED KNOWLEDGE GRAPH

(71) Applicant: Kyndryl, Inc., New York, NY (US)

(72) Inventors: Tim Uwe Scheideler, Schoenenberg (CH); Arjun Udupi Raghavendra, Zürich (CH); Matthias Seul, Martinez, CA (US)

(73) Assignee: Kyndryl, Inc., New York, NY (US)

( * ) Notice: Subject to any disclaimer, the term of this patent is extended or adjusted under 35 U.S.C. 154(b) by 390 days.

(21) Appl. No.: 16/536,342

(22) Filed: Aug. 9, 2019

(65) Prior Publication Data

US 2021/0042438 A1 Feb. 11, 2021

(51) Int. Cl.
*H04L 29/06* (2006.01)
*G06F 21/62* (2013.01)
*G06F 16/901* (2019.01)
*G06N 5/02* (2006.01)
*G06F 21/60* (2013.01)

(52) U.S. Cl.
CPC ...... *G06F 21/6227* (2013.01); *G06F 16/9024* (2019.01); *G06F 21/602* (2013.01); *G06N 5/022* (2013.01)

(58) Field of Classification Search
CPC ............. G06F 21/6227; G06F 16/9024; G06F 21/602; G06N 5/022
USPC .......................................................... 726/26
See application file for complete search history.

(56) References Cited

U.S. PATENT DOCUMENTS

| 8,874,930 | B2 | 10/2014 | Chase |
| 8,887,254 | B2 | 11/2014 | Spalka |
| 9,547,823 | B2 * | 1/2017 | Hu ...................... G06F 3/04842 |
| 9,940,472 | B2 | 4/2018 | Akkiraju |
| 10,164,774 | B2 | 12/2018 | Gregory |
| 10,942,988 | B2 * | 3/2021 | Taylor ................. G06F 16/9024 |
| 2011/0138190 | A1 | 6/2011 | Chase |
| 2011/0173455 | A1 * | 7/2011 | Spalka ................. H04L 9/0863 713/189 |

(Continued)

OTHER PUBLICATIONS

"Community structure", WIKIPEDIA, The Free Encyclopedia, <https://en.wikipedia.org/wiki/Community_structure>, last edited Jul. 7, 2019, 10 pages.

(Continued)

*Primary Examiner* — Shin-Hon (Eric) Chen

(74) *Attorney, Agent, or Firm* — Erik Swanson; George S. Blasiak; Heslin Rothenberg Farley & Mesiti PC

(57) ABSTRACT

A computer-implemented method for managing access rights to a knowledge graph is provided. The method comprises splitting, for each user system, its respective portion of the knowledge graph into a plurality of knowledge subgraphs, encrypting each of the knowledge subgraphs, and generating a plurality of private summary graphs. The method also comprises maintaining a collaboration graph comprising one vertex per user system and edges representing collaborations between the users, mapping all private subgraphs of all user systems to one public summary graph, each vertex of the public summary graph comprises less data than the related vertex of the related private summary graphs and wherein none of the vertices of the summary graph comprises any encryption or decryption key, and granting access to a selected knowledge subgraph from a first user system to a second user system.

20 Claims, 8 Drawing Sheets

(56) References Cited

U.S. PATENT DOCUMENTS

| | | | |
|---|---|---|---|
| 2016/0203327 A1* | 7/2016 | Akkiraju | G06F 21/6218 |
| | | | 707/785 |
| 2017/0322977 A1* | 11/2017 | Naganuma | G06F 21/6227 |
| 2018/0210936 A1* | 7/2018 | Reynolds | G06F 3/0484 |
| 2019/0020482 A1 | 1/2019 | Gupta | |
| 2019/0155961 A1 | 5/2019 | Rogelio | |

OTHER PUBLICATIONS

"Database encryption", WIKIPEDIA, The Free Encyclopedia, last edited on Jul. 15, 2019, <https://en.wikipedia.org/wiki/Database_encryption>, 8 pages.

"Proxy re-encryption", WIKIPEDIA, The Free Encyclopedia, <https://en.wikipedia.org/wiki/Proxy_re-encryption>, last edited on Nov. 14, 2018, 3 pages.

"Public-key cryptography", WIKIPEDIA, The Free Encyclopedia, <https://en.wikipedia.org/wiki/Public-key_cryptography>, last edited on Jul. 15, 2019, 9 pages.

Joshi et al., "Attribute Based Encryption for Secure Access to Cloud Based EHR Systems", Published in: Proceedings of the IEEE Cloud Conference, 2018, San Francisco, < https://mdsoar.org/bitstream/handle/11603/11344/889.pdf?sequence=1>, 4 pages.

Ravizza et al., "Dynamic Access Control for Knowledge Graph", U.S. Appl. No. 15/894,975, IBM Attorney Docket No. P201705424US01, filed on Feb. 13, 2018, 39 pages.

Scheideler et al., "Secure Zones in Knowledge Graph", U.S. Appl. No. 15/904,532, IBM Attorney Docket No. P201704464US01, filed on Feb. 26, 2018, 43 pages.

Patent Cooperation Treaty, PCT, International Search Report, Applicant's File Reference P201901450PCT01, International Application No. PCT /IB2020/056940, International Filing Date: Jul. 23, 2020, 3 pages.

Patent Cooperation Treaty, PCT, Written Opinion of the International Searching Authority, Applicant's File Reference: P201901450PCT01, International Application No. PCT /IB2020/056940, International Filing Date: Jul. 23, 2020, 3 pages.

* cited by examiner

ENCRYPTED KNOWLEDGE GRAPH

BACKGROUND

The invention relates generally to access rights in a knowledge management system, and more specifically, to managing access rights to a knowledge graph with content managed by a plurality of entities.

One of the biggest challenges in enterprise information technology (IT) is the management of unstructured data. In the cognitive computing age, knowledge graphs are used to store, manage, and process information outside of transactional systems. Knowledge graphs are widely accepted instruments to organize a collaboration of people inside organizations and across departments and organizational boundaries.

A knowledge graph comprises at least facts collected from a plurality of sources that are typically stored in vertices, also referred to as nodes, of a mesh and edges, links between the nodes, that store the relationship between the vertices, and thus, a relationship between content items, i.e., facts, stored in the knowledge graph.

Typical knowledge graphs range in size between 1 million and 100 million vertices. Hence, storing and managing a knowledge graph may require a substantial amount of storage and computing capacities in a data center.

Knowledge graphs may typically be used to facilitate collaboration within and between organizations (companies, departments and its employees). Parts of an organization's knowledge graph may comprise confidential data whilst other portions should be made accessible to other selected organizations and/or users. Access control may be provided, e.g., by a central authority, as known in the art. However, a central authority has to be established and maintained consistently. Users have to register and, more importantly, trust the central authority because it maintains all credentials and it may have complete access to all information, restricted and unrestricted. Thus, a central authority may be prohibitive for self-organizing organizations and a decentralized responsibility for content. Furthermore, a central authority may delay required maintenance activities and/or granting and/or removing of access rights.

SUMMARY

According to one aspect of the present invention, a computer-implemented method for managing access rights to a knowledge graph with content managed by a plurality of entities may be provided. The method may comprise splitting, for each user system of a plurality of user systems, its respective portion of the knowledge graph into a plurality of knowledge subgraphs, encrypting each of the knowledge subgraphs using a private key of a knowledge-subgraph-specific asymmetric public/private key pair, and generating a plurality of private summary graphs, one for each user system. Thereby, each private summary graph may comprise one vertex for each knowledge subgraph of the user system. Additionally, each vertex may also comprise the knowledge-subgraph-specific asymmetric public/private key pair.

The method may further comprise maintaining a collaboration graph comprising one vertex per user system and edges representing collaborations between the users, mapping all private subgraphs of all user systems to one public summary graph, each vertex of the public summary graph comprises less data than the related vertex of the related private summary graphs and wherein none of the vertices of the summary graph comprises any of the private keys used to encrypt any of the knowledge subgraphs, and granting access to a selected knowledge subgraph from a first user system to a second user system, by providing a decryption key relating to the selected knowledge subgraph from the first user system to the second user system.

According to another aspect of the present invention, a related knowledge graph management system for managing access rights to a knowledge graph may be provided. The system may comprise a splitting unit adapted for splitting, for each user system of a plurality of user systems, its respective portion of the knowledge graph into a plurality of knowledge subgraphs, an encryption unit adapted for encrypting each of the knowledge subgraphs using a private key of a knowledge-subgraph-specific asymmetric public/private key pair, and a generator adapted for generating a plurality of private summary graphs, one for each user system. Thereby, each private summary graph may comprise one vertex for each knowledge subgraph of the user system, and each vertex may also comprise the knowledge-subgraph-specific asymmetric public/private key pair.

Furthermore, the system may comprise a management unit adapted for maintaining a collaboration graph comprising one vertex per user system and edges representing collaborations between the users, a mapping module adapted for mapping all private subgraphs of all user systems to one public summary graph. Thereby, each vertex of the public summary graph may comprise less data than the related vertex of the related private summary graphs; none of the vertices of the summary graph may comprise any of the private keys used to encrypt any of the knowledge subgraphs.

Additionally, an access module may be adapted for granting access to a selected knowledge subgraph, from a first user system to a second user system, by providing a decryption key relating to the selected knowledge subgraph from the first user system to the second user system.

The proposed computer-implemented method for managing access rights to a knowledge graph which content is managed by a plurality of entities may offer multiple advantages and technical effects:

The present invention may allow an easy, straightforward, effective and efficient way for sharing data and knowledge by the plurality of knowledge graphs—or portions thereof—without requiring a central authentication, authorization and management instance. The knowledge graph—or the plurality of knowledge graphs—becomes, so to speak, self-manageable by the users and content owners of the content stored in the one or more knowledge graphs. A decision about access rights is managed directly by the content owners with their related client systems.

This may increase the motivation to make use of the knowledge graph as well as granting or revoking access rights. Thus, a much more direct control of the knowledge graph may become possible. Cycle times, as well as management overhead, may be reduced.

The control of access management to the knowledge subgraphs is distributed to the users directly. Users "owning" some content in form of a knowledge subgraph decide themselves to whom access is granted and to whom not. Also, the process of revoking access to a particular knowledge subgraph may be in the hand of the knowledge owners.

The layered architecture—in particular the private summary graph layer, the collaboration graph layer and the public summary graph—are instrumental in achieving the fine-granular decentralized access control management of the knowledge subgraphs.

In the following, additional embodiments of the present invention—applicable to the method as well as to the related system—will be described:

According to one advantageous embodiment, the method may also comprise revoking access to the selected knowledge subgraph to the second user system by re-encrypting the selected knowledge subgraph with a new private key of a knowledge-subgraph-specific asymmetric public/private key pair. Thus, the owner of content may have complete control over his content. Even once access is granted to another user, the content owner may revoke access to the content at any time.

According to one preferred embodiment of the method, each vertex of each private subgraph may comprise a summary description of the content of the related knowledge subgraphs. This way, the private subgraphs may become an intermediate layer to content that is owned by a specific user, as well as content that is owned by another user.

According to a useful embodiment, the method may also comprise joining the collaboration graph by creating an account for a new user system in the collaboration graph, the new user system being represented by a new vertex, splitting the content of an outside knowledge graph—in particular outside the main knowledge graph—into a plurality of outside knowledge subgraphs, encrypting the outside knowledge subgraphs—as well as the main knowledge graph, and uploading the outside knowledge subgraphs to the knowledge graph. Thus, new users may at any time decide to share their content with other users already being organized using the main content knowledge graph. A new user may also decide which portion of his content—i.e., of the knowledge graph he or she manages—shall be shareable with other users.

According to one permissive embodiment, the method may also comprise searching through the public summary graph by searching through summary content of the vertices of the public summary graph. The summary knowledge graph is not access restricted. Thus, all users may search through this public area of the knowledge graph. However, it does not mean that the user may have access to content related to a vertex in the private summary graph. It may be required that you may request access to the underlying detailed knowledge graph—i.e., the related content graph.

According to one advantageous embodiment, the method may also comprise granting read access to a knowledge subgraph of a first user system—in particular after receiving an access grant request to a third user system—i.e., any other content of the participating user—by providing, i.e., sending, the public portion of the public/private key pair of the vertex relating the knowledge graph to be granted access to, from the first user system to the third user system. It may be noted that the transmission may be encrypted by the public key of the third user system. It may also be understood that the third user system may generate/define links between elements of his knowledge subgraph and the one of the first user system, as well as and adding a new vertex in third user system private summary graph. This may allow a large degree of flexibility of fine-grained content access control.

According to another advantageous embodiment, the method may also comprise adding edges between vertices of the knowledge subgraph of the first user system and the knowledge subgraph of the third user system by the third user system. By this mechanism, each user may have the best control over its own content, in particular what other users may see and read.

According to a further advantageous embodiment, the method may also comprise granting write access to a knowledge subgraph of a first user system—in particular and again, after receiving a related write request—to a third user system by providing (also here, by sending it) the private/public key pair of the vertex relating the knowledge graph to be granted access to, from the first user system to the third user system, and enabling a rollback option for the first user system after the third user system has changed a vertex—in particular, at least one—of a knowledge subgraph relating to the first user system. Thus, any user of the system may also have optionally total control over the management—in particular changing and adding new content—of that part of the knowledge graph owned by that specific user.

According to one optional embodiment of the method, the knowledge graph may be selected out of the group comprising a collection of flat files, a relation database or an object database and, a graph database. Thus, basically any useful data organization for knowledge graphs may be used for the present invention.

According to one preferred embodiment, the method may also comprise enabling all user systems—having installed the appropriate client application—sharing an access to a joint knowledge graph to perform the activity steps of splitting, encrypting, generating, maintaining, mapping, and granting. This set of features may support a proper management of the underlying content sharing concept.

According to another optional embodiment of the method, the knowledge subgraphs may partially be distributed across different storage platforms. Thus, the main knowledge graph may not necessarily be one consistent knowledge graph in one single storage system—but a collection of a plurality of knowledge subgraphs distributed across different systems and potentially also across different locations.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

Figure 1:
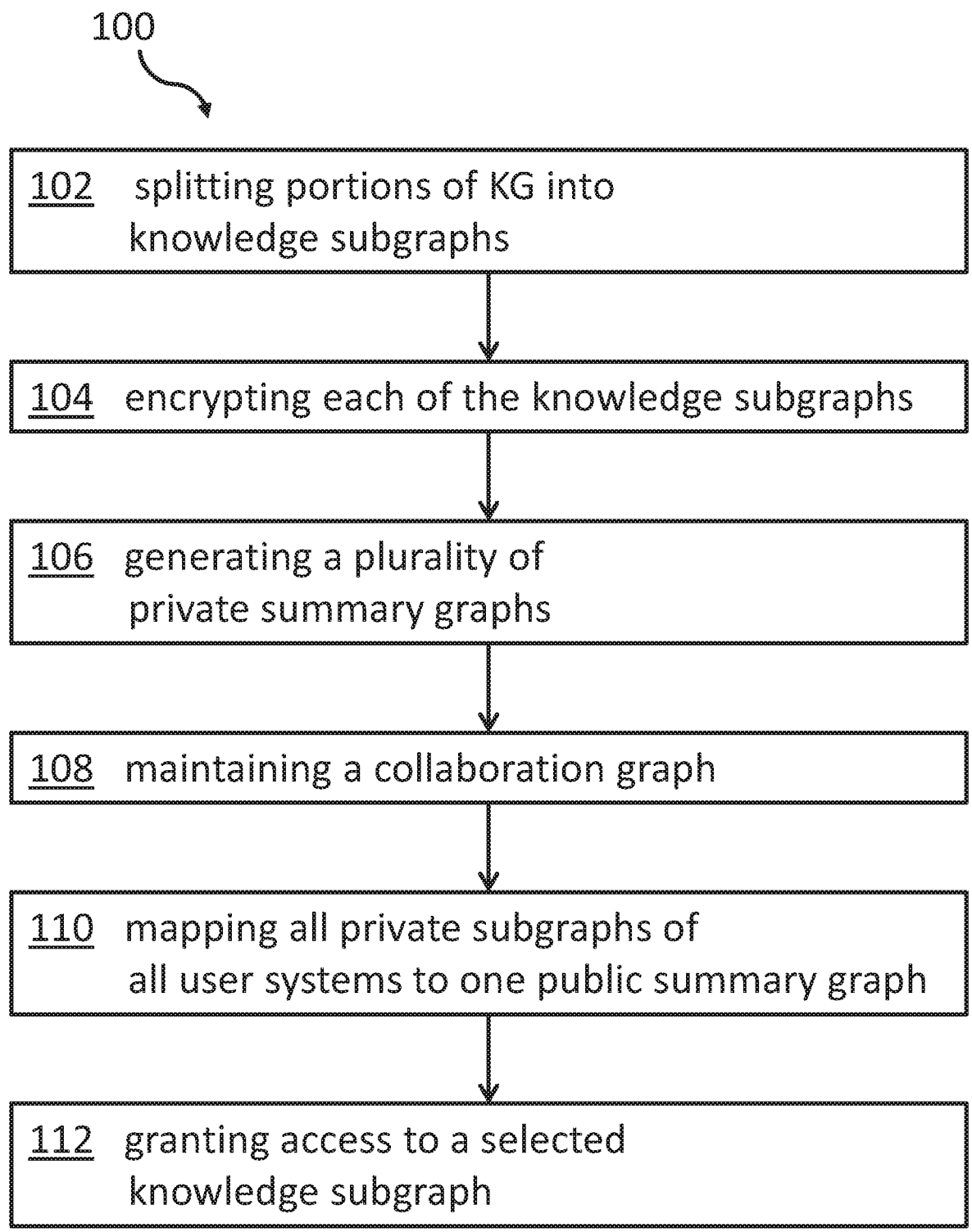
FIG. 1 shows a block diagram of an embodiment of a computer-implemented method for managing access rights to a knowledge graph with content managed by a plurality of entities.

A disadvantage of known solutions remains to be the central management and the inability of known solutions to share parts of knowledge graphs with other departments and/or organizations without requiring a central authority for authentication and authorization. An administrator, having super-user rights, should be made redundant and superfluous.

Hence, there may be a need to overcome limitations of the known solutions, in particular, to provide a knowledge management system that allows sharing of portions of a knowledge graph without a cumbersome centralized administrative entity.

In the context of this description, the following conventions, terms and/or expressions may be used:

The term 'knowledge graph' may denote a semantically organized data pool relating entities—i.e., content items—to each other. The content items may be represented as vertices (or nodes) that are selectively linked by edges (or links) defining the relationship between the content items. The knowledge graph may be organized as a plurality of flat files, as well as in one or more databases.

The term 'user system' may denote a computing system, typically a personal computer or workstation adapted to execute software applications under the control of an operating system. The client referred to throughout the present invention may denote the software application. A user may be represented by such a workstation.

The term 'knowledge-subgraph-specific asymmetric public/private key pair' may denote public/private key pair exclusively being generated for a dedicated knowledge subgraph. The generation may be performed by the client (application). The public part may be shared and the private key may only be accessible by a very restricted group of systems, typically those having access to the content items of the knowledge subgraphs.

The term 'private summary graphs' may denote a layer in the layered architecture organized one level above the knowledge subgraph. It may be used to organize the different knowledge subgraphs in the content level.

The term 'vertex' may denote a logical entity representing content or users in a knowledge graph. Vertices may also be used for management purposes. The vertices may selectively be linked by edges representing dependencies between content items, users, access rights and/or a mixture of them.

The term 'content graph' may denote the lowest level of the content graph architecture. The content graph is composed of a plurality of knowledge subgraphs comprising vertices representing the content items. Throughout the present invention the terms 'content graph' and 'knowledge graph' may be used synonymously; however, it may be understood that the lowest level may comprise a plurality of knowledge subgraphs which may be connected to build a complete content graph or a plurality of content graphs not being connected because users did not built links between them.

The term 'private summary graph' may denote a knowledge graph layer above the content graph comprising one vertex for each subgraph of the content graph, subgraphs of a user as well as of collaborators. Basically, a vertex of the private summary graph represents a summary of the corresponding subgraphs as well as additional management information (i.e., encryption/decryption keys).

The term 'collaboration graph' may denote the next knowledge graph layer above the private summary graph. Each vertex of the collaboration graph may represent a user of the knowledge graph. From here, links may go to all content items of all knowledge subgraphs of the content graph layer the user has access to, his own knowledge subgraphs, as well as to those knowledge subgraphs of collaborators he or she has access to.

The term 'public summary graph' may represent the content of the content graph layer—i.e., the summary of the knowledge subgraphs—in a summarized form. The public summary graph may represent the highest layer of the knowledge graph architecture. A vertex of the public summary graph may comprise only the summary of the corresponding knowledge subgraphs. The public summary graph may represent the initial search and navigation layer with unrestricted access by all users.

The term 'collaboration' may denote here that a user allows access to content subgraphs he or she manages to another user.

The term 'access' may denote that a user not owning and managing a content subgraph may have allowed another user to read the content. The owning user may also allow another user, i.e., a collaborator, to write new content to the subgraphs or also change existing content, i.e., write access.

The term 're-encrypting' may denote that subgraphs—in particular the information stored in the vertices of subgraphs—may be re-encrypted with a new key directly without decrypting it and storing it immediately. This way, content items of a sub graph may never be exposed during the period between decryption and a new encryption. The re-encryption is the basis for revoking access to content items in respect to a user which may have had access to it before.

In the following, a detailed description of the figures will be given. All instructions in the figures are schematic. Firstly, a block diagram of an embodiment of the inventive computer-implemented method for managing access rights to a knowledge graph with content managed by a plurality of entities is given. Afterwards, further embodiments, as well as embodiments of the knowledge graph management system for managing access rights to a knowledge graph, will be described.

FIG. 1 shows a block diagram of an embodiment of the computer-implemented method 100 for managing access rights to a knowledge graph with content managed by a plurality of entities. In general, users are represented by their computer system (i.e., workstation) running an application and/or a browser. The method 100 comprises splitting, 102, for each user system—representing a specific user—of a plurality of user systems, its respective portion of the knowledge graph into a plurality of knowledge subgraphs; encrypting, 104, each of the knowledge subgraphs using a private key of a knowledge-subgraph-specific asymmetric public/private key pair; and generating, 106, a plurality of private summary graphs, one for each user system, wherein each private summary graph comprises one vertex—in particular, exactly one—for each knowledge subgraph of the user system. Thereby, each vertex also comprises the knowledge-subgraph-specific asymmetric public/private key pair. i.e., an encryption key, as well as a decryption key.

The method 100 also comprises maintaining, 108, a collaboration graph comprising one vertex per user system and edges representing collaborations between the users; and mapping, 110, all private subgraphs of all user systems to one public summary graph, wherein each vertex of the public summary graph comprises less data than—or an equal number to—the related vertex of the related private summary graphs, and wherein none of the vertices of the summary graph comprises any of the private keys used to encrypt any of the knowledge subgraphs.

The method 100 also comprises granting, 112, access to a selected knowledge subgraph from a first user system to a second user system, by providing a decryption key relating to the selected knowledge subgraph from the first user system to the second user system.

Figure 2:
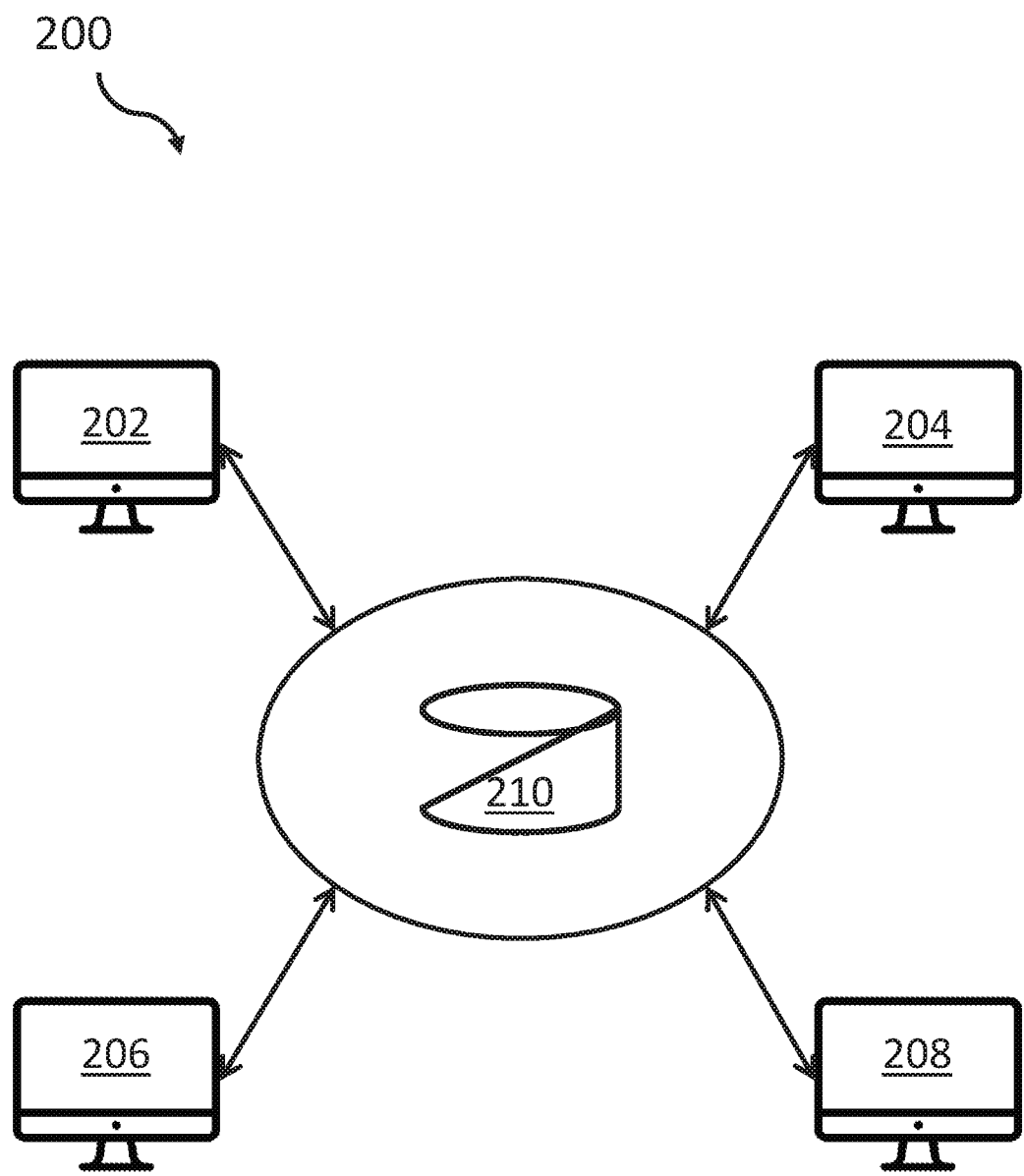
FIG. 2 shows a block diagram of an embodiment of a plurality of user systems in a communicative connection to a central storage.

FIG. 2 shows a block diagram 200 of an embodiment of a plurality of user systems in communicative connection (wire-bound or wireless network) to a central storage. Thus, the underlying infrastructure comprises only two types of principal components, user workstations 202, 204, 206, 208 running the client (a software application) and shared storage 210, e.g., publicly accessible cloud storage. The knowledge graphs are encrypted and stored on shared storage 210. Only the summary graph is stored unencrypted and can be accessed by all user systems. All other data is protected by encryption from access. Access must be granted individually. In one implementation, shared storage 210 is provided as flat file storage, in another implementation as a relational database management system (RDBMS). The client (application) running on the user's workstation generates sets of asymmetric encryption keys used, performs encryption and decryption, and accesses the knowledge graphs.

As discussed in detail below, the present invention is based on four levels of knowledge graphs. The actual (formerly unencrypted) knowledge graph is called the content graph and is divided in several subgraphs allowing specific users accessing specific content. The access may be role-based. (i) The subgraphs and their encryptions are handled by (ii) the private summary graph, which is itself encrypted. (iii) The collaboration graph connects the users, which are presented as vertices and transports shared encrypted keys. (iv) The unencrypted public graph allows users to search content owned by fellow collaborators.

By sharing keys for decryption and encryption, users can start collaborating with fellow collaborators, i.e., other users, i.e., other user computer systems, i.e. other workstations.

Figure 3:
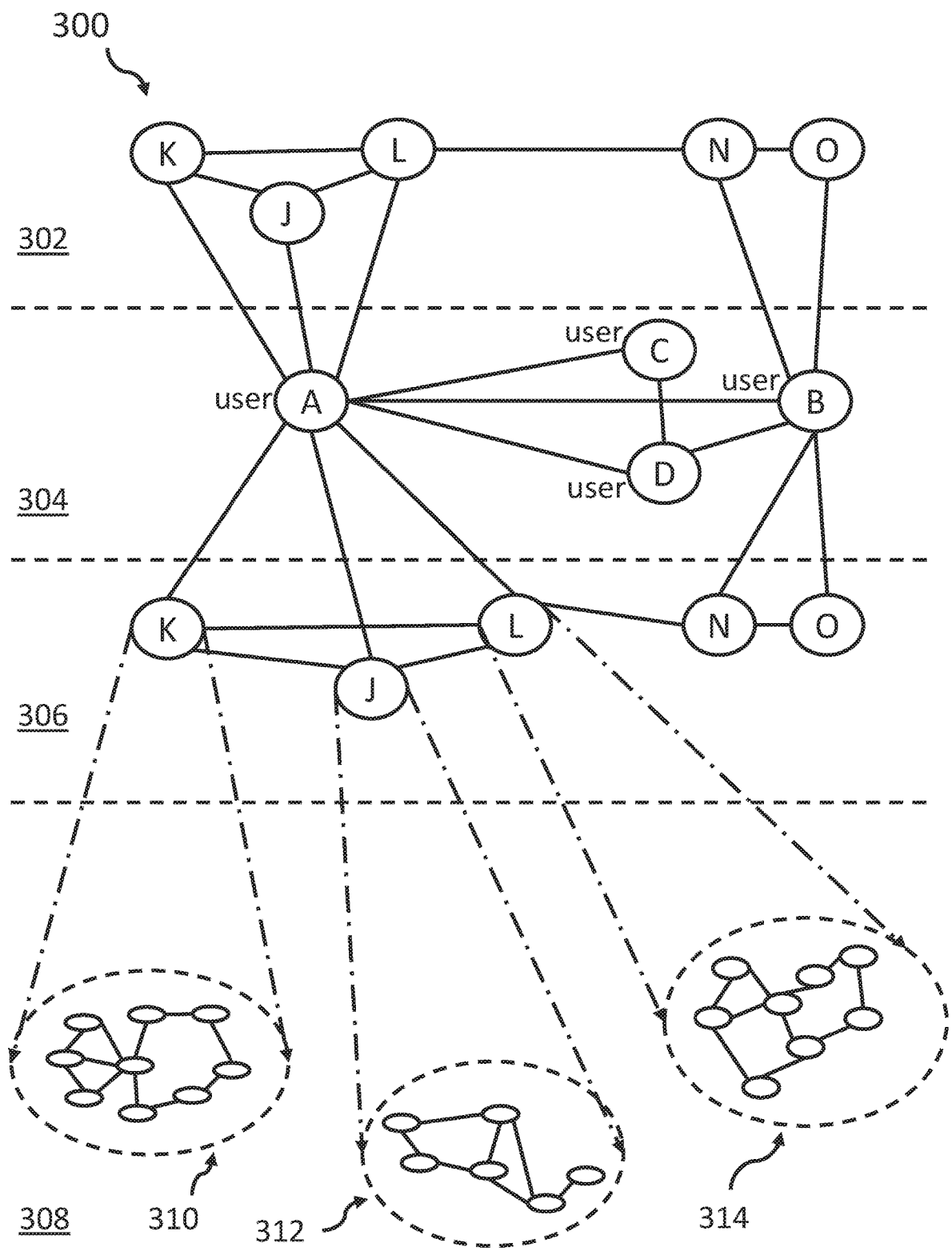
FIG. 3 shows a block diagram of an embodiment of the layered architecture of the present invention.

FIG. 3 shows a block diagram of an embodiment of the layered architecture 300 of the present invention. Four layers of knowledge graphs are shown: the public knowledge graph 302, the collaboration graph 304, the private summary graph 306, and the content graph 308 comprising a plurality of knowledge subgraphs. As shown, the different knowledge graph layers are separated by horizontal dashed lines.

Edges are stored on the links between vertices. Say vertices A and B are connected, a reference to B is stored on A and a reference to A is stored on B. In some cases, the attributes of the partial edge from A to B and B to A may differ.

For each knowledge graph/for each knowledge subgraph an index of vertices is maintained.

A summary of a graph comprises one or more of the following: the abstraction of its structure (like a coarse graph), tags assigned to vertices, keywords of the vertices content, and a list of vertices.

Asymmetric encryption is used to protect content and make content available to selected individuals or groups. Asymmetric cryptography is used in such a way that users generate key pairs consisting out of a key for encryption $K_{enc}$ (known also as private key) and a key for decryption $K_{dec}$ (also known as public key). The activities of key generation, encryption, and decryption are done by the client on the user's workstation. A certificate authority like public key infrastructure (PKI) is advantageously not required.

It may also be noted that in the following diagrams, lines without an arrowhead denote bidirectional edges and arrows denote unidirectional edges. For example, the connection from vertex J to the group of loads 312 of the content graph 308 is unidirectional.

The lowest level contains the content graph(s) 308, i.e., the knowledge subgraphs. Its source is the original, unencrypted knowledge graph. The content graph 308 has been divided into knowledge subgraphs so that individual sets of content 310, 312, 314 (subgraphs) can be shared with fellow collaborators. The owner of a specific knowledge graph can take various approaches to define subgraphs.

For instance: (i) During the creation or during extending the knowledge graph, the owner defines subgraphs based on content and potential collaborators. (ii) The owner uses an algorithm to find community structures and uses them to divide the knowledge graph based on its structure. Algorithms for finding communities may comprise the minimum-method, hierarchical clustering, the Girvan-Newman algorithm, modularity maximization, statistical interference, and click-based methods. Densely linked areas from a center of a subgraph and loosely coupled vertices are distributed among different subgraphs. (iii) The owner groups the vertices by content, e.g. the owner generates a list of topics and each vertex is assigned to the closest matching topic. (iv) A combination of the above.

Each subgraph (J, K, L) 310, 312, 314 is encrypted with a different private key. By sharing the corresponding decryption key, access to a subgraph can be given to other users. The content graph may contain links to graphs owned by other users (see dotted lines 406 in FIG. 4).

The private summary graph 306 comprises one vertex for each subgraph of the content graph 308—both own subgraphs and subgraphs of collaborators. Two vertices in the private summary graph 306 are linked if there exists at least one edge between the vertices of the respective subgraphs. Each vertex of the private summary graph 306 includes: a list of vertices of the corresponding subgraph; a summary of the corresponding subgraph; for own subgraphs and for subgraphs of collaborators with write access, the decryption and encryption key of the corresponding subgraph; for subgraphs of collaborators with read-only access, the decryption key of the corresponding subgraph; and the storage location of the subgraph. It may also be noted that the private summary graph is encrypted. Initially, the key for decryption is not to be shared.

The collaboration graph 304 represents the connections with knowledge graphs of other users (e.g., U, C, D, B). Vertices represent users (the user itself and the collaborators). Each user U, C, D, B has a unique identifier assigned that is generated when the user joins the system. Edges between the vertices of the collaboration graph summarize the edges created between vertices of the user's subgraph(s) and the collaborator's graph(s). In case more than one collaborator granted access to its subgraph(s) and edges between their subgraphs have been found, the linkage between the collaborators' subgraphs is summarized in the collaboration graph (e.g., between vertices B and C).

A vertex in the collaboration graph 304, representing the user (e.g., U, C, D, B), is linked to all vertices owned by the user in both the public summary graph 302 and private summary graph 306. A collaborator can in principle follow an edge to a vertex located in the private summary graph 306 but cannot access the vertex (and its subsequent edges) as the vertex is encrypted. A user vertex also receives and stores access request from collaborators.

The public summary graph 302 comprises (as the private summary graph 306) one vertex (e.g., J, K, L, N, O) for each subgraph. However, a vertex only comprises the summary of the corresponding subgraph. It does not comprise keys or a list of vertices. The summary on the public summary graph 302 may not contain the level of information as on the private summary graph. However, it should be comprehensive enough to produce a meaningful search result.

A vertex also contains the storage location of the subgraph in the content graph. Each vertex is linked to the user vertex of the vertex owner. The client will add an edge between the vertices of different owners only once a (at least unilateral) collaboration has been established and at least one edge between the corresponding subgraphs of the content graph have been added.

In one implementation, the central knowledge graph storage (see FIG. 2, 210) is implemented as a set of flat files, a vertex is represented by a file and edges are stored in the vertex file as references to other files (i.e., path and file name).

In another implementation, an industry standard knowledge graph database is used. These graph databases are relational databases, in which each object (a vertex) has a primary, unique key. Other objects related to an object (vertices connected by edges) are referred to by "foreign keys", which are the values of primary keys stored as an attribute in the object.

In one implementation, a single graph database is used by all clients. In another implementation, several graph databases are used or even each client sets up its own graph database. As a matter of course, all graph databases must be compatible, i.e., follow the same standard and each graph database must have a unique identifier. All databases allow (at least read) access by a generic user ID (identifier) which is used by the clients, i.e., the applications on the user's workstations.

One should consider that the public summary graph 302 is disjointed, i.e., two or more subgraphs are not sharing edges. This is at least the case when a new user joins (see below). After having joint and sharing subgraphs, respective users may define edges between subgraphs.

If a single graph database is used, the client accesses the table of vertices of the public summary graph 302, which comprises for each vertex a pointer to the content (called "storage location" above).

If multiple graph databases are used, the client scans the storage system for graph databases and accesses each database's table of vertices of the public summary graph, which contains for each vertex a pointer to the content (called "storage location" above). When multiple graph databases are used, the primary keys are not unique across the databases; therefore, edges are implemented as a tuple (database identifier, primary key).

As general fundamental operations, the following may be considered: users joining, searching the summary graph, granting access, revoking or removing access. These different scenarios will be described in the following.

User Joining

If a new user wants to join the collaboration network, he or she has to subscribe to the shared storage. Each user must have a client installed on their workstation supporting accessing and maintaining a knowledge graph.

As a first step, the user creates a vertex representing himself/herself in the collaboration graph 304 (exemplary shown as user A in FIG. 3). Initially, the vertex representing the user is not linked to any other vertex.

The user decides on the number of initial subgraphs. The user creates one or more key pairs ($Key^i_{enc}$, $Key^i_{dec}$), one for each subgraph, e.g., i=J, K, L, as shown in FIG. 3. On the workstation, the user generates the subgraphs either by populating them with vertices and edges or by importing an existing knowledge graph and dividing it into subgraphs, as described above. The client encrypts each subgraph with the corresponding key $Key^i_{enc}$ and uploads the subgraph to the central storage. As edges are stored with the vertices, edges connecting subgraphs are found in both subgraphs.

For each subgraph uploaded, the client adds a vertex to the summary graph and adds the edges to the vertex, as described above.

The user's client generates the "user specific" key pair $Key^A_{enc}$ and $Key^A_{dec}$ and encrypts the private summary graph with this key. $Key^A_{dec}$ is stored only on the user's workstation and is never shared. $Key^A_{enc}$ is stored on the collaboration graph, accessible for (potential) collaborators.

Searching the Summary Graph

For searching the public summary graph 302, any graph search algorithm can be used. In one implementation, an algorithm for sparsely linked graphs is used. In another implementation the graph database table(s) listing the summary graph vertices J, K, L, N, O can be traversed in a known manner.

Granting Access

Figure 4:
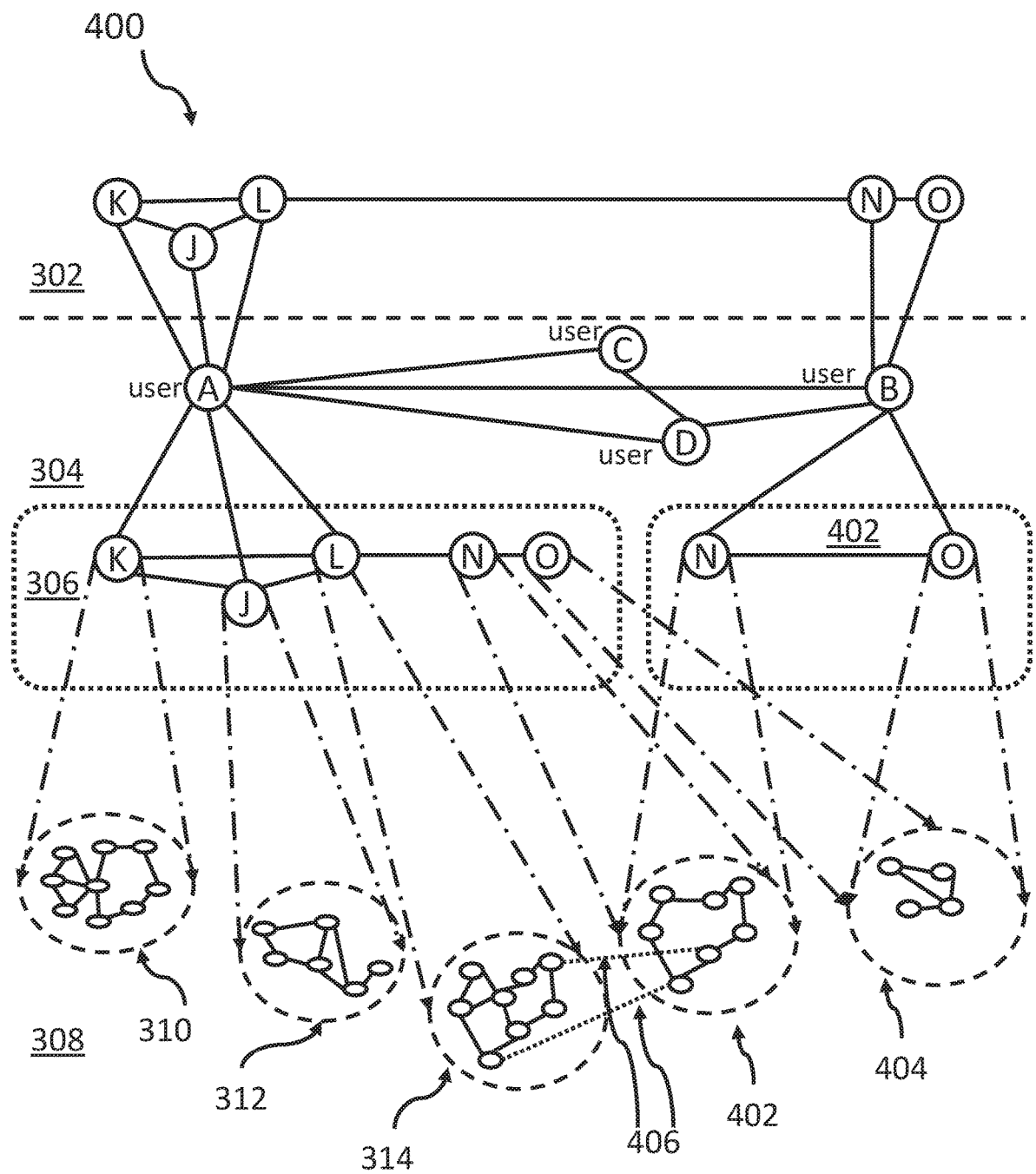
FIG. 4 shows a diagram of an embodiment of the layered architecture with a granted access to additional knowledge subgraphs.
Figure 5:
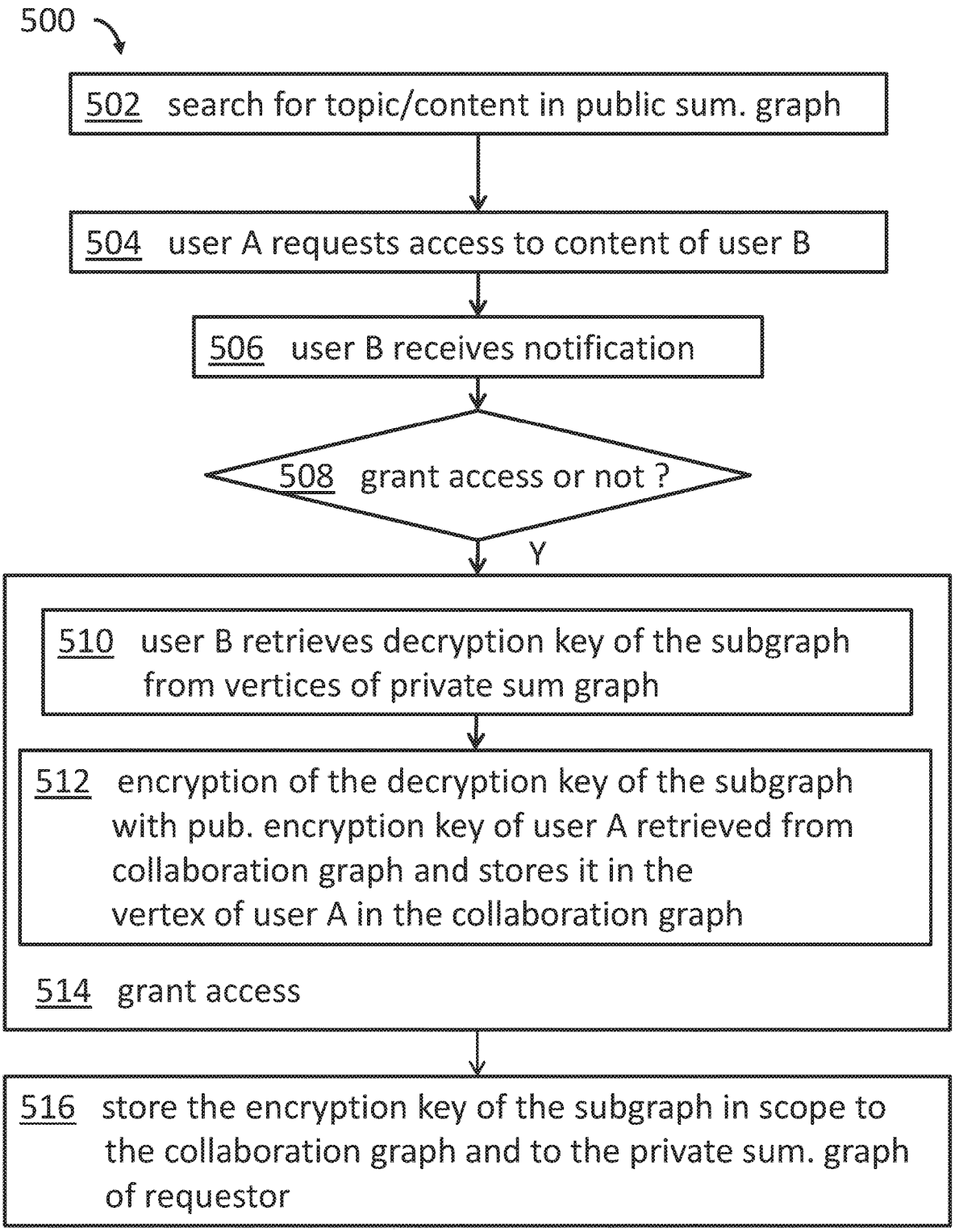
FIG. 5 shows a block diagram of a flowchart of the sub-processes "grant access" and "write access".

FIG. 4 shows a diagram of an embodiment of the layered architecture 400 with a granted access to additional knowledge subgraphs. FIG. 4 describes the grant access process to content of another user. FIG. 5 shows a block diagram of flowchart 500 of the sub-processes "grant access" and "write access".

After a first user—e.g., user A—has searched and identified, 502, content of interest in one or more subgraphs owned by second user—e.g., user B—, user A requests, 504, access to these subgraph(s)—e.g., subgraphs 402, 404. In this process, the client of user A stores an access request on the vertex of user B in the collaboration graph 306. The client of user B picks up the request.

User B receives, 506, a notification and can grant (or deny) access. After a decision 508 of user B to grant access, the client of user B retrieves, 510, the decryption key(s) of the content subgraph(s) (e.g., 402, 404, FIG. 4) from the corresponding vertices of the private summary nodes N, O, then, encrypts, 512, these decryption keys of the private summary graph 306 with the encryption key of user A (retrieved from the collaboration graph) and stores them on user A's vertex in the collaboration graph 304.

To illustrate this process, FIG. 4, showing a user A centric view, has been extended showing also the details for user B indicated by dashed lines from vertex N of the left private summary graph 306 to subgraph 402 and from vertex O of the left private summary graph 306 (surrounded by dashed lines) to subgraph 404.

Thus, user A searched the public summary graph 302 and found interesting content on the vertices N and O. It is noted that user A had started the search either on vertex N or O, or on a vertex connected via a path to N or O as at this point of time a (direct) connection between L and N does not exist.

The client of user A identifies the vertices N and O to be owned by user B and creates an access request on the vertex of user B. User B grants access, 514. The client of user B retrieves the encryption key of user A ($Key^A_{enc}$) from the collaboration graph 304 and two decryption keys $Key^N_{dec}$ and $Key^O_{dec}$ from its own private summary graph 306 (right portion of that graph layer). Using $Key^A_{enc}$, the client of user B encrypts $Key^N_{dec}$ and $Key^O_{dec}$ and stores, 516, them on the vertex of user A in the collaboration graph 308.

The client of user A retrieves the two encrypted keys from the vertex of user A and decrypts them using $Key^A_{dec}$. In the workstation memory, the client generates two summary vertices N and O by copying the vertices of the public summary graph, storing $Key^N_{dec}$ and $Key^O_{dec}$ correspondingly and (optionally) enriching the two new vertices N and O by summarizing the subgraphs 402, 404 relating to vertices N and O by an algorithm pre-selected by user A. Finally, the client encrypts the two new summary nodes using $Key^A_{enc}$ and adds them to the private summary graph 306 (right portion of the knowledge graph layer) of user A.

Write Access

Modifying of vertices or edges of an encrypted knowledge graph implies that encryption is included in the write process. In case the storage is implemented as flat files (each file representing a vertex and its edges), the user has to encrypt only one file per vertex update. In case a knowledge graph database is implemented, column level encryption or (preferably) field level encryption is used to minimize the computational effort for a vertex update.

Working in a multi-user environment, one may consider that encryption does not prevent users from overwriting or deleting data with may be a malicious intent. This method supports two approaches:

Approach A) In one implementation, the storage may allow unrestricted write access for all users. This implies that (1) a collaborator who received the appropriate encryption key can update content in such a way that the owner cannot distinguish which one of the collaborators updated a vertex if several collaborators received write access and (2) any user can delete content independent of a possession of a key.

For this implementation, the following method is provided. For each vertex (including its edges), a hash key is calculated after a write operation. It is to be noted that a deletion will result in the hash key 0. The owner maintains a register of all hash keys of its subgraphs and a backup of all subgraphs. These can be either stored on the user's workstation or on a separate central storage system (not shown). On a pre-defined interval, the client checks the actual hash keys, and, in case of the deviation, informs the user about a write or deletion activity on a subgraph. The user can decide on a roll-back operation.

From a process point of view, requesting and granting write access works in the same way as requesting and granting read access, but additionally to the decryption keys and the encryption keys for the subgraphs in scope must be added (in an encrypted format) to the collaboration graph of the requester and in turn to the private summary graph of the requester.

This approach has the advantage that modifications can be performed by invited collaborators in real-time.

Approach B) In another implementation, the creator of a subgraph is only allowed to modify a subgraph, or, more precisely, the data object containing the subgraph. In case the storage is implemented as flat files, the data object can be a directory. In case a knowledge graph database is implemented, the data object is a database table.

Initially, when a user joins the system, the client generates a user ID. The user ID is stored on the workstation. Whenever a new subgraph/data object is created, this user ID is stored as metadata with the data object. The client sends the user ID with every write request. When the storage receives a write request to the data object, the user ID is compared to the metadata of the data object and, only in the case of a match, the storage system performs the write operation. Updates by collaborators are transported (via the owner's user vertex) to the owner of the subgraph as changed vertices, i.e., either as a flat file or as database table row. The owner's client displays the change in conjunction with the surrounding knowledge graph to the owner, and the owner decides whether to accept or reject the change. For trusted collaborators, the owner may decide to auto-accept changes. Upon acceptance, the owner's client adds the changes to the subgraph encrypted with the appropriate key of the subgraph.

This approach has the advantage that the owner controls modifications before they are effective. Thus, a higher level of content consistency can be achieved in a collaborative environment.

Removing Access

Removal of access is performed using re-encryption, which means that content encrypted with $Key^X_{enc}$ and which can so far be decrypted using $Key^X_{dec}$ is processed in such a way that it can be only decrypted using the new $Key'_{dec}$. For the re-encryption, a combination of the $Key^X_{dec}$ and $Key^Y_{enc}$ is used.

In prior art, re-encryption is mostly discussed in the context of proxy re-encryption (PRE). In the present invention, a combined key is generated to re-encrypt a subgraph directly, i.e., without decrypting it first and encrypting it subsequently, meaning, without leaving the subgraph exposed during the period between decryption has been finalized and an encryption has started.

Figure 6:
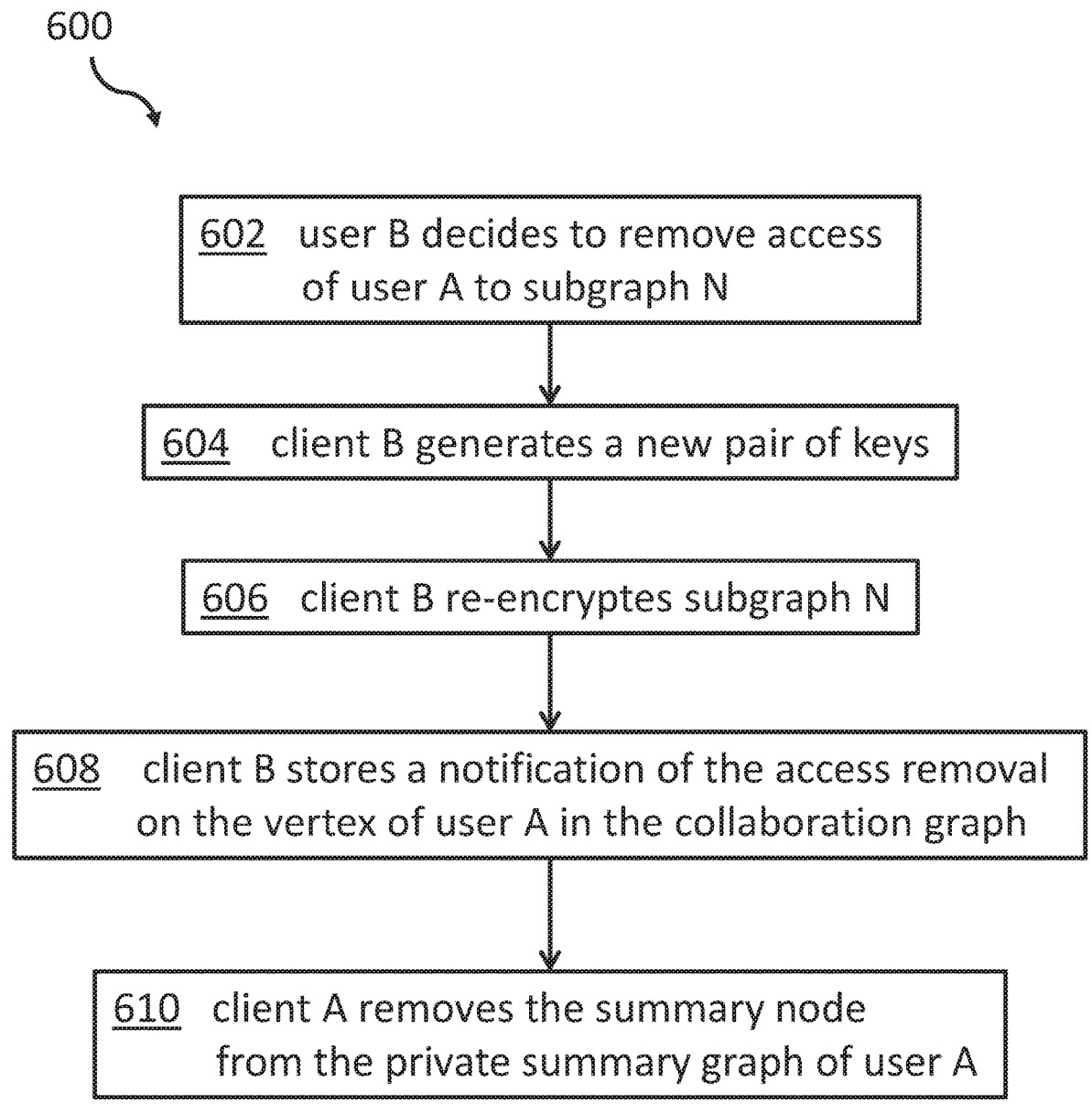
FIG. 6 shows a block diagram of a flowchart of the sub-process "remove access".

FIG. 6 shows a block diagram of a flowchart of the sub-process "remove access". Following the previous example, user B wants to remove access for user A to subgraph N only, 602. The client of user B generates, 604, a new key pair ($Key^M_{dec}$, $Key^M_{enc}$) and a combined key [$Key^N_{dec}|Key^M_{enc}$]. The client re-encrypts, 606, subgraph N with the key [$Key^N_{dec}|Key^M_{enc}$] and stores, 608, a notification of access removal on the vertex of user A in the collaboration graph. The client of user A removes, 610, the summary node from the private summary graph of user A.

In case user B has shared subgraph N with other users (say, C and D) and wants them to maintain access, the client of user B stores also a notification of re-encryption on the vertices of user C and user D together with the new decryption key $Key^M_{dec}$ encrypted with $Key^C_{enc}$ and encrypted with $Key^D_{enc}$ respectively, ensuring so that only user C and D can use $Key^M_{dec}$.

Searching a Graph

One may keep in mind that unencrypted data belonging to a private summary graph 306 or content graph 308 is only kept on the users' workstations. Buffering part of a graph on the workstations can improve the performance, and usually the larger the buffer, the higher the performance. However, the method does not require a buffer of a certain size.

A graph search starts at a given vertex (or a set of vertices for parallel search) and traverses the graph by following the edges. At the start of the search, the given vertex is decrypted (if it is not already found unencrypted in the client's buffer). In parallel, while the search processes the first vertex, all vertices connected to the first vertex are decrypted. In turn, while the search processes the content of the $n^{th}$ vertex, all vertices connected to the $n^{th}$ vertex are decrypted. In case the client buffer runs full, the vertices at the beginning of the search path are removed from the buffer.

In case the search path crosses a subgraph boundary, by either entering another subgraph of the same user or of a collaborator, the decryption key is replaced. In one implementation, the search process checks in advance in the private summary graph whether the current decryption key is valid for the subsequent vertex. In another implementation, the search process only retrieves an encryption key from the summary graph after the decryption of a vertex failed due to using a wrong key.

In case the search process enters a subgraph for which a decryption key is not available, e.g., the collaborator has withdrawn access (i.e., re-encrypted the subgraph), the search algorithm regards the edge to the subgraph as non-existing and redirects the search path.

Managing Knowledge Subgraphs

In case the owner of a subgraph wants to share only parts of the subgraph with a collaborator, the owner must split the subgraph. The client decrypts the subgraph on the workstation, splits the subgraph using the selected method, encrypts the new set of subgraphs with new, distinct keys, replaces the single subgraph by the set of subgraphs in question, and updates the public summary graph and the owner's private summary graph. So that the collaborators keep their access, the client encrypts the new set of subgraph encryption keys with the collaborators encryption keys and stores them on the respective users' vertices. Additionally, a message is stored on the users' vertices referring to the updated public summary graph, so that each collaborator's client can update the private summary graph accordingly.

In case the owner of a subgraph wants to consolidate several subgraphs into one subgraph, the owner selects the subgraphs in the client. The client determines the largest of the subgraphs either in terms of number of vertices or in terms of overall storage used by the vertices. The client decrypts the other n−1 subgraphs on the workstations, encrypts them with the encryption key of the largest subgraph, replaces the subgraphs of the newly encrypted subgraphs, and updates the public summary graph and the owner's private summary graph. Concerning the collaborators who had former access to at least the largest subgraph, the client stores a message on the collaborators' vertices informing them about the update to the summary graph. Concerning the collaborators who had former access to other subgraphs but not to the largest subgraph, the client stores the personally encrypted subgraph encryption key and a message on the collaborators' vertices informing them about the update to the summary graph.

Alternatively, the owner could decide not to grant access to consolidated graphs to collaborators who had not access to all subgraphs in the first place.

Figure 7:
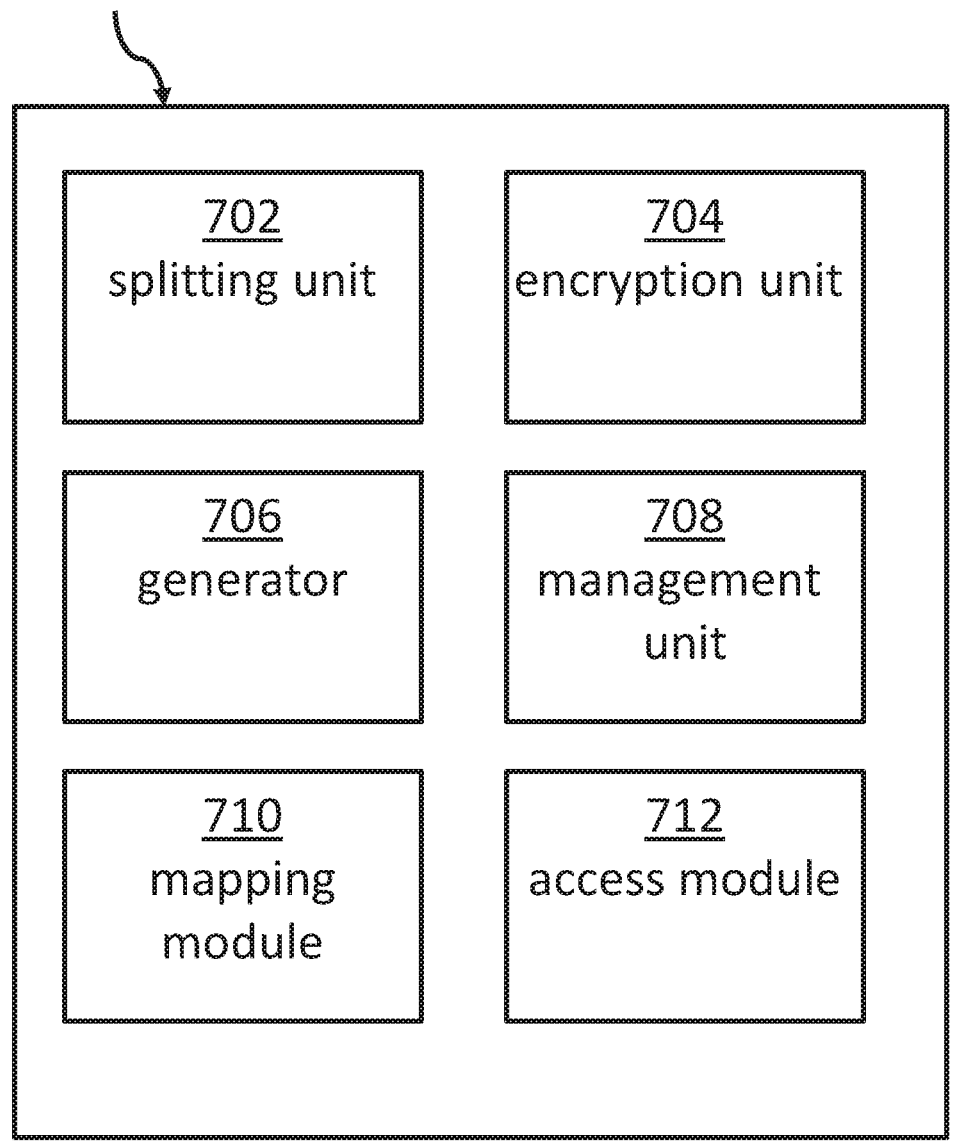
FIG. 7 shows a block-diagram of a system for managing access rights to a knowledge graph with content managed by a plurality of entities.

FIG. 7 shows a block diagram of the knowledge graph management system 700 for managing access rights to a knowledge graph stored in one or more storage units with content managed by a plurality of entities. The system 700 comprises a splitting unit 702 adapted for splitting, for each user system of a plurality of user systems, its respective portion of the knowledge graph into a plurality of knowledge subgraphs (see FIG. 3, 312, 312, 314), an encryption unit 704 adapted for encrypting each of the knowledge subgraphs using a private key of a knowledge-subgraph-specific asymmetric public/private key pair, and a generator 706 adapted for generating a plurality of private summary graphs, one for each user system. Thereby, each private summary graph (see FIG. 3, 306) comprises one vertex for each knowledge subgraph of the user system, wherein each vertex also comprises the knowledge-subgraph-specific asymmetric public/private key pair.

The system 700 also comprises a management unit 708 adapted for maintaining a collaboration graph, comprising one vertex per user system and edges representing collaborations between the users; a mapping module 710 adapted for mapping all private subgraphs of all user systems to one public summary graph, wherein each vertex of the public summary graph comprises less data than the related vertex of the related private summary graphs, and wherein none of the vertices of the summary graph comprises any of the private keys used to encrypt any of the knowledge subgraphs; and an access module 712 adapted for granting access to a selected knowledge subgraph from a first user system to a second user system, by providing a decryption key relating to the selected knowledge subgraph from the first user system to the second user system.

Figure 8:
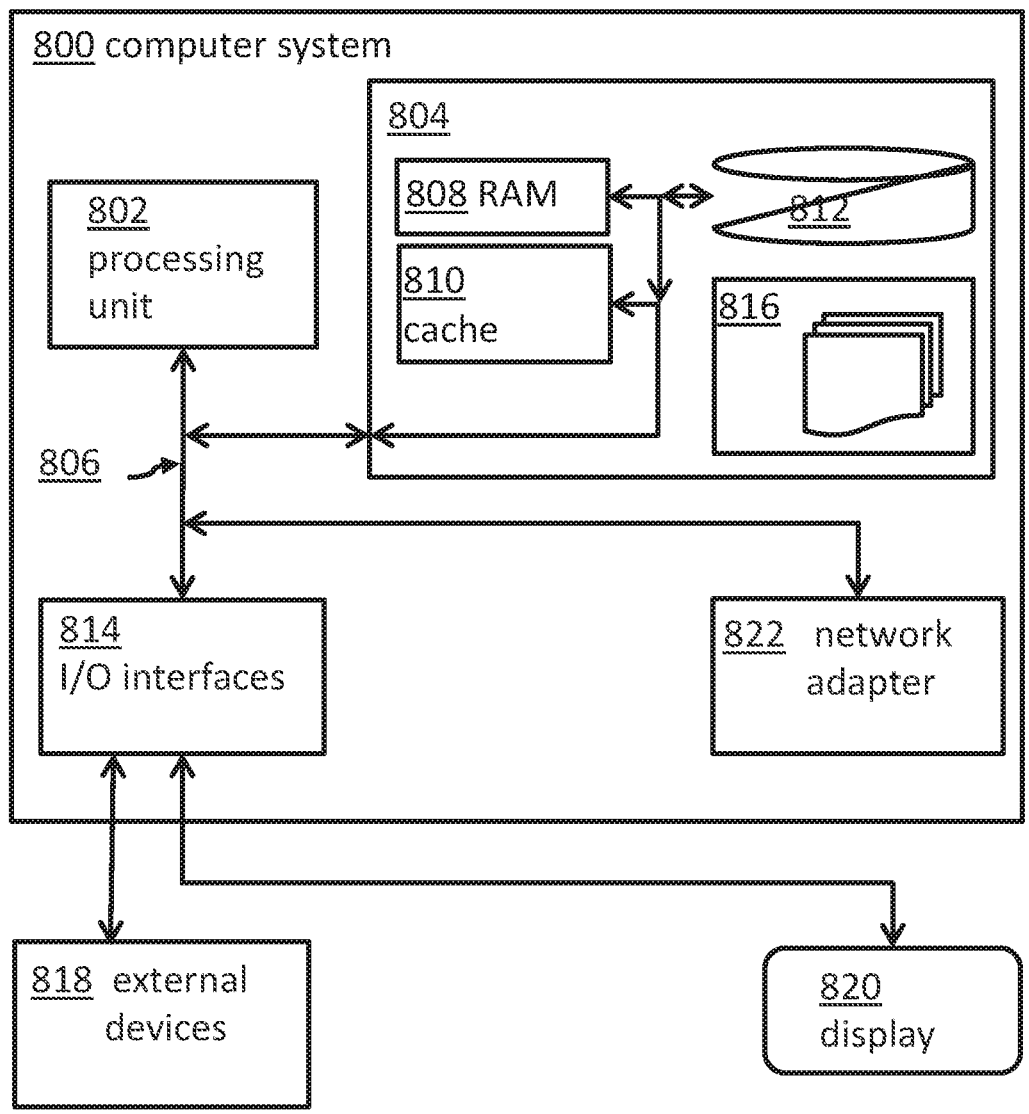
FIG. 8 shows a block diagram of a computing system instrumental for the present invention.

Embodiments of the invention may be implemented together with virtually any type of computer, regardless of the platform being suitable for storing and/or executing program code. FIG. 8 shows, as an example, a computing system 800 suitable for executing program code related to the proposed method. Each workstation 202 (see FIG. 2) may be implemented in form of the computing system 800, as well as any system controlling the central storage system 204 (see FIG. 2) and the nodes and servers controlling the knowledge graphs and knowledge subgraphs.

The computing system 800 is only one example of a suitable computer system and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in FIG. 8, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via input/output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the knowledge graph management system 700 for managing access rights to a knowledge graph—and in particular portions of it—may be attached to the bus 806.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for managing access rights to a knowledge graph with content managed by a plurality of user systems, the computer-implemented method comprising:
    splitting, by one or more processors, a respective portion of the knowledge graph into a plurality of knowledge subgraphs for each user system of the plurality of user systems;
    encrypting, by one or more processors, each of the knowledge subgraphs using a private key of a public/private key pair;
    generating, by one or more processors, a plurality of private summary graphs, wherein:
        a private summary graph is generated for each user system,
        each private summary graph comprises one vertex for each knowledge subgraph of the respective user system, and
        each vertex comprises the public/private key pair;
    maintaining, by one or more processors, a collaboration graph comprising one vertex for each user system and edges representing collaborations between the plurality of user systems;
    mapping, by one or more processors, the plurality of private summary graphs of the plurality of user systems to a public summary graph; and
    granting, by one or more processors, access to a selected knowledge subgraph from a first user system to a second user system by providing a decryption key relating to the selected knowledge subgraph from the first user system to the second user system.

2. The computer-implemented method of claim 1, further comprising:
    revoking, by one or more processors, access to the selected knowledge subgraph to the second user system by re-encrypting the selected knowledge subgraph with a second private key of a second key pair.

3. The computer-implemented method of claim 1, further comprising:
    joining, by one or more processors, the collaboration graph by:
        creating, by one or more processors, an account for a new user system in the collaboration graph, wherein the new user system is represented by a new vertex,
        splitting, by one or more processors, content of a second knowledge graph into a plurality of second knowledge subgraphs,
        encrypting, by one or more processors, the plurality of second knowledge subgraphs, and uploading, by one or more processors, the plurality of second knowledge subgraphs to the knowledge graph.

4. The computer-implemented method of claim 1, further comprising:
granting, by one or more processors, read access to a knowledge subgraph of a third user system to a fourth user system by providing a public portion of the public/private key pair of a vertex relating the knowledge graph.

5. The computer-implemented method of claim 4, further comprising:
adding, by one or more processors, edges between vertices of the knowledge subgraph of the third user system and the knowledge subgraph of the fourth user system by the fourth user system.

6. The computer-implemented method of claim 1, further comprising:
granting, by one or more processors, write access to a knowledge subgraph of a third user system to a fourth user system by providing the public/private key pair of the vertex relating the knowledge graph to be granted access to from the third user system to the fourth user system; and
enabling, by one or more processors, a rollback option for the third user system when the fourth user system has changed a vertex of a knowledge subgraph relating to the third user system.

7. The computer-implemented method of claim 1, further comprising:
enabling, by one or more processors, the plurality of user systems sharing access to the knowledge graph to perform the steps of splitting, encrypting, generating, maintaining, mapping, and granting.

8. A knowledge graph management system for managing access rights to a knowledge graph stored in one or more storage units with content managed by a plurality of user systems, the knowledge graph management system comprising:
a splitting unit adapted for splitting a respective portion of the knowledge graph into a plurality of knowledge subgraphs for each user system of the plurality of user systems;
an encryption unit adapted for encrypting each of the knowledge subgraphs using a private key of a public/private key pair;
a generator adapted for generating a plurality of private summary graphs, wherein:
a private summary graph is generated for each user system,
each private summary graph comprises one vertex for each knowledge subgraph of the respective user system, and
each vertex comprises the public/private key pair;
a management unit adapted for maintaining a collaboration graph comprising one vertex for each user system and edges representing collaborations between the plurality of user systems;
a mapping module adapted for mapping the plurality of private summary graphs of the plurality of user systems to a public summary graph; and
an access module adapted for granting access to a selected knowledge subgraph from a first user system to a second user system by providing a decryption key relating to the selected knowledge subgraph from the first user system to the second user system.

9. The knowledge graph management system of claim 8, wherein the access module is further adapted for revoking access to the selected knowledge subgraph to the second user system by re-encrypting the selected knowledge subgraph with a second private key of a second public/private key pair.

10. The knowledge graph management system of claim 8, further comprising:
a join unit adapted for joining the collaboration graph by:
creating an account for a new user system in the collaboration graph, wherein the new user system is represented by a new vertex,
splitting content of a second knowledge graph into a plurality of second knowledge subgraphs,
encrypting the plurality of second knowledge subgraphs, and
uploading the plurality of second knowledge subgraphs to the knowledge graph.

11. The knowledge graph management system of claim 8, wherein the access module is further adapted for granting read access to a knowledge subgraph of a third user system to a fourth user system by providing a public portion of the public/private key pair of a vertex relating the knowledge graph.

12. The system of claim 11, further comprising:
a maintenance module adapted for adding edges between vertices of the knowledge subgraph of the third user system and the knowledge subgraph of the fourth user system by the fourth user system.

13. The knowledge graph management system of claim 8, wherein the access module is further adapted for:
granting write access to a knowledge subgraph of a first user to a third user system by providing the public/private key pair of the vertex relating the knowledge graph to be granted access to from the first user system to the third user system; and
enabling a rollback option for the first user system when the third user system has changed a vertex of a knowledge subgraph relating to the first user system.

14. The knowledge graph management system of claim 8, wherein the plurality of user systems is further adapted to share access to the knowledge graph to perform the steps of splitting, encrypting, generating, maintaining, mapping, and granting.

15. A computer program product for managing access rights to a knowledge graph with content managed by a plurality of user systems, the computer program product comprising:
one or more computer-readable storage media and program instructions stored on the one or more computer-readable storage media, the program instructions comprising:
program instructions to split a respective portion of the knowledge graph into a plurality of knowledge subgraphs for each user system of the plurality of user systems;
program instructions to encrypt each of the knowledge subgraphs using a private key of a public/private key pair;
program instructions to generate a plurality of private summary graphs, wherein:
a private summary graph is generated for each user system,
each private summary graph comprises one vertex for each knowledge subgraph of the respective user system, and each vertex comprises the public/private key pair;
program instructions to maintain a collaboration graph comprising one vertex for each user system and edges representing collaborations between the plurality of user systems;
program instructions to map the plurality of private summary graphs of the plurality of user systems to a public summary graph; and
program instructions to grant access to a selected knowledge subgraph from a first user system to a second user system by providing a decryption key relating to the selected knowledge subgraph from the first user system to the second user system.

16. The computer program product of claim 15, further comprising:
program instructions to revoke access to the selected knowledge subgraph to the second user system by re-encrypting the selected knowledge subgraph with a second private key of a second key pair.

17. The computer program product of claim 15, further comprising:
program instructions to join the collaboration graph by:
program instructions to create an account for a new user system in the collaboration graph, wherein the new user system is represented by a new vertex,
program instructions to split content of a second knowledge graph into a plurality of second knowledge subgraphs,
program instructions to encrypt the plurality of second knowledge subgraphs, and
program instructions to upload the plurality of second knowledge subgraphs to the knowledge graph.

18. The computer program product of claim 15, further comprising:
program instructions to grant read access to a knowledge subgraph of a third user system to a fourth user system by providing a public portion of the public/private key pair of a vertex relating the knowledge graph.

19. The computer program product of claim 18, further comprising:
program instructions to add edges between vertices of the knowledge subgraph of the third user system and the knowledge subgraph of the fourth user system by the fourth user system.

20. The computer program product of claim 15, further comprising:
program instructions to grant write access to a knowledge subgraph of a first third system to a fourth user system by providing the public/private key pair of the vertex relating the knowledge graph to be granted access to from the third user system to the fourth user system; and
program instructions to enable a rollback option for the third user system when the fourth user system has changed a vertex of a knowledge subgraph relating to the third user system.

* * * * *